US011242956B2

(12) United States Patent
Schaub

(10) Patent No.: US 11,242,956 B2
(45) Date of Patent: Feb. 8, 2022

(54) DEVICE FOR HOLDING A PRESSURE CYLINDER

(71) Applicant: Markus Schaub, Wetzlar (DE)

(72) Inventor: Markus Schaub, Wetzlar (DE)

( * ) Notice: Subject to any disclaimer, the term of this patent is extended or adjusted under 35 U.S.C. 154(b) by 0 days.

(21) Appl. No.: 16/839,257

(22) Filed: Apr. 3, 2020

(65) Prior Publication Data

US 2020/0318796 A1    Oct. 8, 2020

(30) Foreign Application Priority Data

Apr. 5, 2019    (DE) .................... 10 2019 108 983.2

(51) Int. Cl.
*F17C 13/08* (2006.01)
*F16B 2/08* (2006.01)

(52) U.S. Cl.
CPC ............... *F17C 13/08* (2013.01); *F16B 2/08* (2013.01)

(58) Field of Classification Search
CPC .................................. F17C 13/08; F16B 2/08
See application file for complete search history.

(56) References Cited

U.S. PATENT DOCUMENTS

| 7,270,209 | B2* | 9/2007 | Suess ............... B60K 15/03006 180/69.5 |
| 2006/0033322 | A1* | 2/2006 | Suess ..................... B60K 15/07 280/830 |
| 2012/0161430 | A1* | 6/2012 | Mulanon ............... F17C 13/084 280/834 |
| 2015/0096977 | A1* | 4/2015 | Sirosh ..................... B60K 15/07 220/4.14 |
| 2019/0322223 | A1* | 10/2019 | Hancock ................... F16B 2/08 |

FOREIGN PATENT DOCUMENTS

DE    10 2010 053 891    7/2011
DE    10 2017 104 754    9/2018

* cited by examiner

*Primary Examiner* — Anita M King
(74) *Attorney, Agent, or Firm* — Clark & Brody LP

(57) ABSTRACT

The invention relates to a device (10) for holding a pressure cylinder, the device (10) having a frame element (12), a cylinder space (14) for receiving a pressure cylinder and at least one band element (16) for securing a pressure cylinder in the cylinder space (14), the band element (16) being connected to the frame element (12), wherein at least one damping element (20) is connected to the band element (16), the damping element (20) being arranged between the cylinder space (14) and the frame element (12). In this way, the invention provides an improved device (10) for holding pressure cylinders, the device (10) preventing oscillations from being transmitted into the cylinder space (14).

9 Claims, 4 Drawing Sheets

DEVICE FOR HOLDING A PRESSURE CYLINDER

FIELD OF THE INVENTION

The invention relates to a device for holding a pressure cylinder.

BACKGROUND ART

When utilizing pressure cylinders, holding devices for the pressure cylinders are used in order to make secure mounting of the pressure cylinders possible. In particular, in vehicles, pressure cylinders are fastened to the vehicle by means of a holding device in order to prevent the pressure cylinder from tipping over or being thrown in the vehicle. The term vehicle is in this case to be understood in the general sense and includes water, land and air vehicles.

In this case, holding devices are known in which the pressure cylinders are connected to the vehicle by means of a securing band which is fastened to a frame structure. However, the vehicle transmits oscillations and vibrations onto the pressure cylinder by way of the holding device.

SUMMARY OF THE INVENTION

The object of the invention can therefore be considered that of providing an improved device for holding pressure cylinders, the device preventing transmission of oscillations.

In the case of a device for holding a pressure cylinder, the device having a frame element, a cylinder space for receiving a pressure cylinder and at least one band element for securing a pressure cylinder in the cylinder space, the band element being connected to the frame element, provision is made according to the invention for at least one damping element to be connected to the band element, the damping element being arranged between the cylinder space and the frame element.

The invention provides a device for holding pressure cylinders, a pressure cylinder in a cylinder space of the device being fixed to a frame element by a band element. The cylinder space is in this case configured for receiving a pressure cylinder. A damping element, which is connected to the band element, is arranged between the cylinder space and the frame element. Oscillations and vibrations which act on the frame element are thus reduced between the cylinder space and the frame element by means of the damping element, and can also be shielded completely from the cylinder space. In this way, the invention provides an improved device for holding pressure cylinders, the device preventing oscillations from being transmitted into the cylinder space. In this case, it is possible to remove the pressure cylinder both toward the front and laterally. The device can thus also readily be used in the case of confined space conditions and is easy to operate.

The frame element can in this case be configured for connection to a vehicle. To this end, the frame element can be fastened to the vehicle with fastening means, for example. A pressure cylinder which is held and secured on the device by means of the band element is thereby fixed to the vehicle.

In another example, the frame element can be mounted on feet of slip-resistant design. The device can thereby be transferred without great outlay.

According to one example, the frame element can have at least one fastening piece for the fastening of a band element, the fastening piece comprising at least two mutually spaced-apart tunnels through which the band element is to be led, the at least one band element extending through both tunnels.

The damping element thus extends around the band element. Direct contact between the band element and the frame element is thus prevented at the position of the damping element. This also means that direct contact between the cylinder space, or a pressure cylinder arranged in the cylinder space, and the frame element is likewise prevented. The tunnels further provide a device which is easy to operate and produce, and which is intended to connect the damping element to the band element.

At least part of the at least one damping element can further be arranged between the two tunnels of a fastening piece.

The damping element is thus arranged along the band element, between the tunnels of the fastening piece. The tunnels thus hold the damping element in position relative to the fastening piece. Since the fastening piece is fixedly connected to the frame element, the damping element is fixedly positioned relative to the frame element. This prevents the damping element from slipping along the band element.

The at least one damping element can be arranged between the band element and the frame element.

In this way, vibrations which pass from the frame element in the direction of the band element are reduced, or prevented entirely, by means of the damping element. Transmission of vibrations or oscillations by way of the band element onto a pressure cylinder, which is held by the band element, in the cylinder space is thereby prevented.

According to one example, provision can further be made for the at least one damping element to have a band tunnel through which the band element is to be led, the band element extending through the band tunnel.

The damping element can thus be captively fastened to the band element, the band element further being coupled to the damping element such that it can be displaced through the band tunnels. The damping element further encloses the band element at the position of the band tunnels, such that oscillations or vibrations are damped on all sides of the band element at the band tunnels.

The frame element can have at least one rib element which extends at least partially around the cylinder space and the at least one band element. In this case, the rib element can be arranged at the position of the band element and extend at least partially around the band element.

The rib element provides impact protection for the cylinder space. External objects collide, at the position of the rib element, with the rib element instead of with a pressure cylinder in the cylinder space. This reduces the risk of damage to pressure cylinders arranged in the cylinder space.

The device can further have a further damping element, the further damping element having a further band tunnel through which the band element is to be led, the damping element being arranged on the at least one band element such that it can be moved along the band element, and the at least one band element extending through the further band tunnel.

Further regions of the cylinder space and of a pressure cylinder arranged therein are shielded against oscillations and vibrations with the further damping element.

At least part of the further damping element can in this case be arranged between the band element and the rib element.

Oscillations and vibrations which are transmitted from the frame element by way of the rib element into the cylinder space are thus reduced, or shielded completely, by the further damping element.

The at least one damping element can be a rubber buffer. The band element can further be a strap.

BRIEF DESCRIPTION OF THE DRAWINGS

Further features, details and advantages of the invention become apparent from the phrasing of the claims and from the following description of exemplary embodiments with reference to the drawings. In the figures:

DETAILED DESCRIPTION OF THE INVENTION

Figure 1:
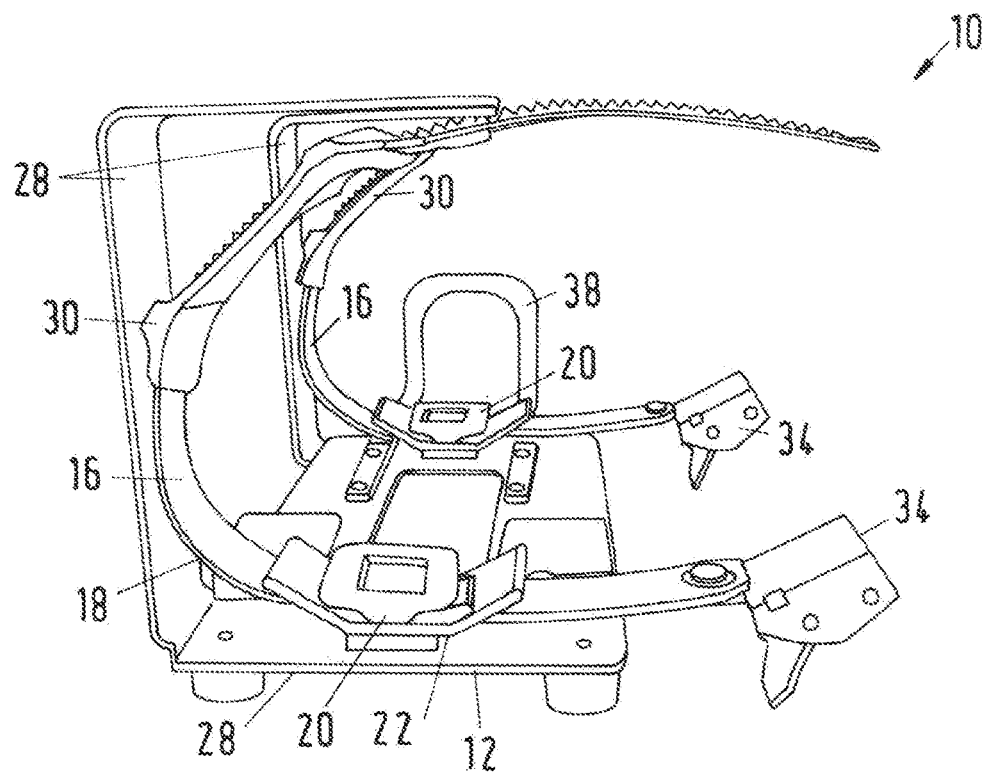
FIG. 1 shows a schematic illustration of a holding device with an open band element.

The device for holding a pressure cylinder is referenced in its entirety in FIG. 1 with the reference sign 10.

Figure 3A:
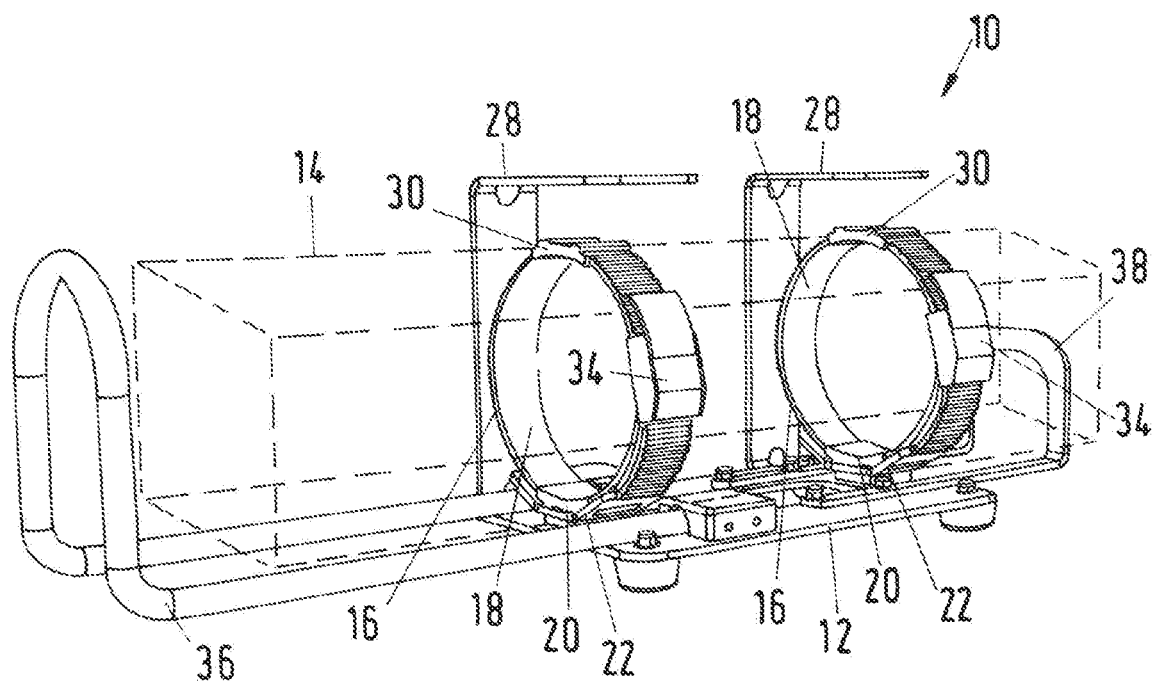
FIGS. 3a-e show various views of a schematic illustration of a holding device.

The device 10 comprises a frame element 12 which forms a holding frame for the entire device 10. A cylinder space 14 of the device 10 is defined on the frame element 12, said space being configured for receiving a pressure cylinder. For reasons of clarity, the cylinder space 14 is illustrated merely in FIG. 3a. The frame element 12 can in this case have elements which are configured for connecting the frame element 12 to a vehicle.

The further components of the device 10 are fastened to the frame element 12. In this case, the device 10 further has a band element 16 for securing a pressure cylinder in the cylinder space 14. In this case, an inner side 18 of the band element 16 points toward the cylinder space 14. The band element 16 is connected to the frame element 12 and can be configured, for example, as a strap. A pressure cylinder which is arranged in the cylinder space 14 is connected to the frame element 12 by means of the band element 16. To this end, the band element 16 has a closing element 34, with which the band element 16 can be closed. FIG. 1 illustrates the band element 16 in the open state. The device 10 can in this case have further band elements 16. In the exemplary embodiment according to FIG. 1, the device 10 has two band elements 16.

The device 10 further comprises a damping element 20. The damping element 20 is arranged between the cylinder space 14 and the frame element 12 and is connected to the band element 16. Vibrations or oscillations which are transmitted from the outside onto the frame element 12 are reduced, or shielded completely, between the frame element 12 and the cylinder space 14 by the damping element 20.

The frame element 12 can in this case be arranged such that the cylinder space 14 is arranged above the frame element 12. A pressure cylinder which is arranged in the cylinder space 14 therefore rests on the damping element 20 and has no direct contact with the frame element 12 as a result.

The device 10 can in this case have more than one damping element 20. In this case, each damping element 20 can be assigned to a respective band element 16, such that each band element 16 of the device 10 has a damping element 20 which is arranged between the cylinder space 14 and the frame element 12.

The band element 16 can be connected to the frame element 12 by means of a fastening piece 22. Fastening piece 22 is in this case fixedly connected to the frame element 12. The fastening piece 22 further has at least two mutually spaced-apart tunnels 24 through which the band element 16 is to be led. The band element 16 extends through both tunnels 24.

The band element 16 is further mounted in the two tunnels 24 in a movable manner. The band element 16 can thus be displaced in the direction of extent thereof through the tunnels 24.

The damping element 20 is arranged between the two tunnels 24. In this case, the damping element 20 is held between the two tunnels 24 by the band element 16. The band element 16 can further hold the damping element 20 between the band element 16 and the fastening piece 22.

In this case, the damping element 20 can have a band tunnel 26 through which the band element 16 is to be led. The band element 16 extends in this case through the band tunnel 26, such that the damping element 20 extends, at the position thereof, around the band element 16. The damping element 20 is thus arranged between the band element 16 and the fastening piece 22, and also between the cylinder space 14 and the band element 16.

In that case, a pressure cylinder which is arranged in the cylinder space 14 therefore rests merely on the damping element 20 and also has no contact with that part of the band element 16 which is arranged between the cylinder space 14 and the frame element 12. Any oscillations or vibrations which emanate from the frame element 12 are therefore absorbed and reduced, or shielded completely, by the damping element 20.

The device 10 further has at least one rib element 28 which extends from the frame element 12 at least partially around the cylinder space 14. The rib element 28 is used to protect the pressure cylinder arranged in the cylinder space 14 against damage as a result of objects falling onto the device 10.

In the exemplary embodiment according to FIG. 1, one rib element 28 is in this case provided for each band element 16. The rib element 28 which is assigned to the band element 16 is in this case arranged at the position of the respective assigned band element 16. The assigned rib element 28 extends in this case at least partially around the band element 16. In this case, the rib element 28 protects in particular the band element 16 against external objects.

In this case, the device 10 can have a further damping element 30 which has a further band tunnel 32 through which the band element 16 is to be led. The band element 16 is in this case arranged in the further band tunnel 32 and extends through the further band tunnel 32. Therefore, the further damping element 30, like the damping element 20, extends around the band element 16. The band element 16 is further mounted in the band tunnel 32 in a movable manner and can move along the direction of extent of the band element 16 in the band tunnel 32.

A further damping element 30 can be provided for each band element 16, such that at least one further damping element 30 is assigned to each band element 16.

Owing to the movable mounting in relation to the band element 16, the further damping element 30 can be arranged at least partially between the cylinder space 14 and the rib element 28. Vibrations and oscillations which are transmitted from the frame element 12 onto the rib element 28 are therefore reduced, or shielded completely, by further damping element 30. Said vibrations and oscillations therefore reach the cylinder space 14 and the pressure cylinder arranged therein merely in an attenuated form, if at all.

The damping element 20 and the further damping element 30 can be configured as rubber buffers. A pressure cylinder which is arranged in the cylinder space 14 is thus shielded by the rubber buffers from oscillations and vibrations which are transmitted from the holding frame 12 and/or the elements 24.

The device 10 further comprises a support element 38 which can support a pressure cylinder which is arranged in the cylinder space 14. The support element 38 extends away from the frame element 12 in a direction perpendicular to a direction of extent of the band element 16. In this case, a bottom of the pressure cylinder is arranged on the support element 38. The support element 38 is further used to protect the bottom of the pressure cylinder against damage as a result of other objects which are arranged outside of the device 10.

Figure 2:
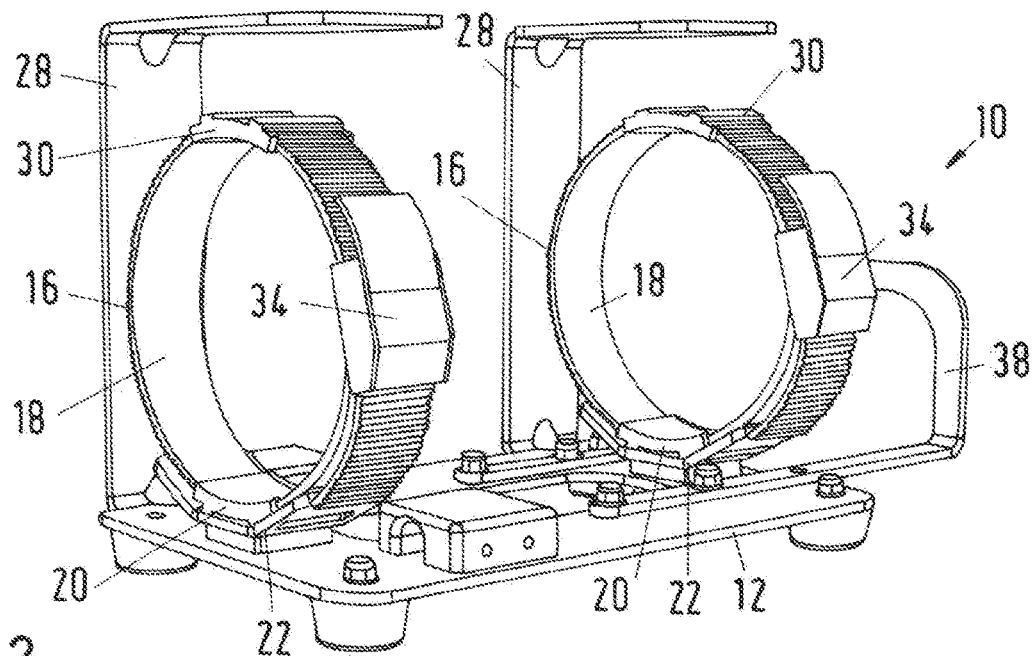
FIG. 2 shows a schematic illustration of a holding device with a closed band element.

FIG. 2 shows the device 10 with closed band elements 16. To this end, a free end of the band element 16 is led through the closing element 34 and locked on the closing element 34.

It should be noted in this case that the further damping element 30 in FIG. 2 is illustrated as being shorter than the further damping element 30 which is illustrated in FIG. 1. The damping element 30 is nevertheless arranged between the rib element 28 and the cylinder space 14.

FIGS. 3a to 3e show various views of a device 10, with said device 10 additionally having a protective element 36 which extends away from the holding frame 12 in the opposite direction to the support element 38. In this case, the protective element 36 protects a head of a pressure cylinder, which is arranged in the cylinder space 14 according to FIG. 3a, against damage as a result of objects which are arranged outside of the device 10.

Figure 3B:
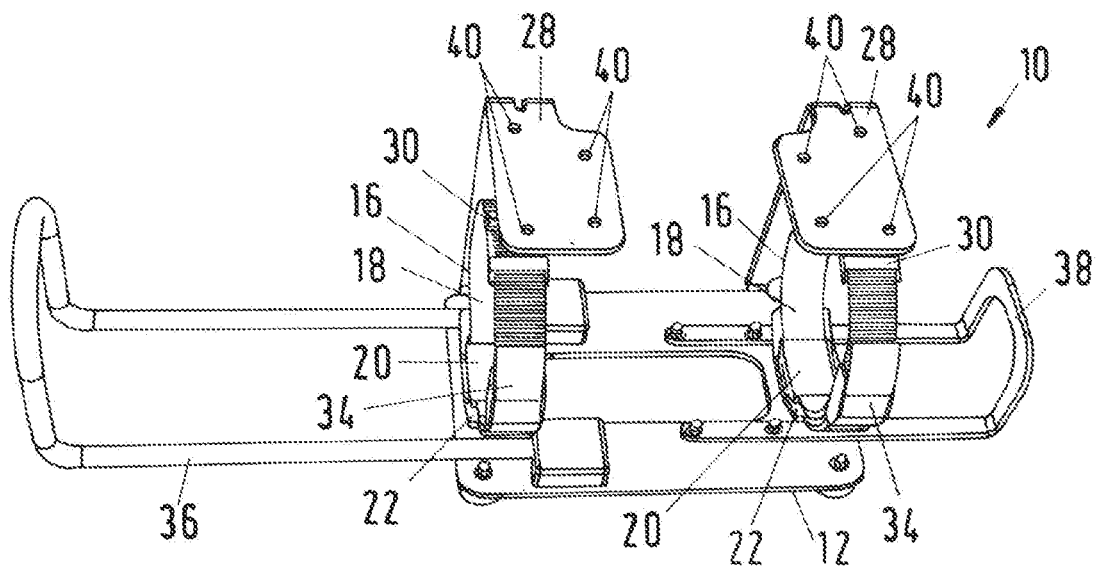

FIG. 3b shows a view of the device 10, in which the upper side of the rib elements 28 is illustrated. The rib elements 28 in this case have bores 40. Further objects can be fastened to the rib elements 28 by means of the bores 40. Said objects are in this case safely spaced apart from the cylinder space 14 by the rib elements 28. In this case, a further device 10 can for example be connected to the rib elements 28 by way of the bores 40, such that two pressure cylinders can be arranged one above the other, on two devices 10, in a space-saving manner.

Figure 3C:
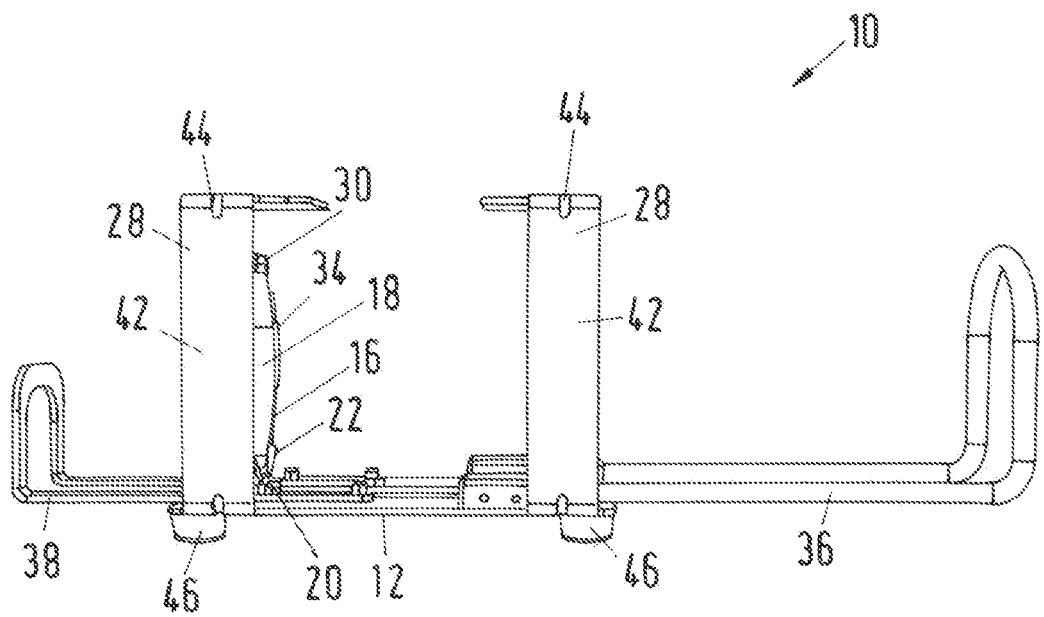

FIG. 3c illustrates the device 10 in a side view, in which the outer side of the rib elements 28 can be seen. In this case, the rib elements 28 have rectilinear elements 42 which are connected to one another by orthogonal angles. The angles are reinforced by beads 44.

Figure 3D:
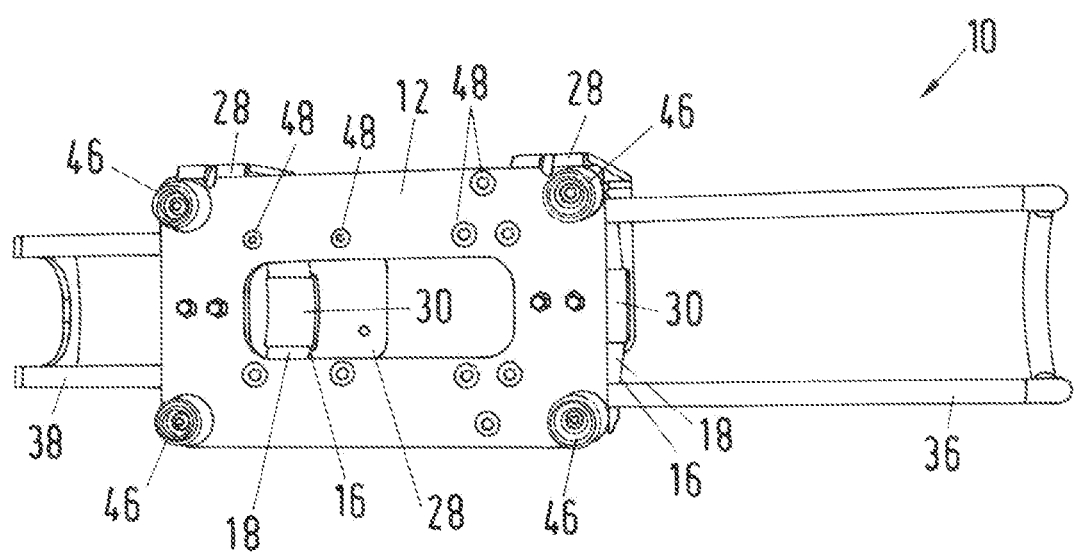

FIG. 3d shows a view of the device 10 from below. In this case, the frame element 12 is illustrated, with a multiplicity of fastening elements 48 being illustrated. The fastening elements 48 are used to connect the further components, such as, for example, the rib elements 28, the protective element 36, the support element 38 and the fastening piece 22, to the frame element 12. The frame element 12 further comprises feet 46, with which the frame element 12 can be set up in a slip-resistant manner. The feet 46 can in this case be produced from rubber, for example. The stability of the device 10 is thereby increased.

Figure 3E:
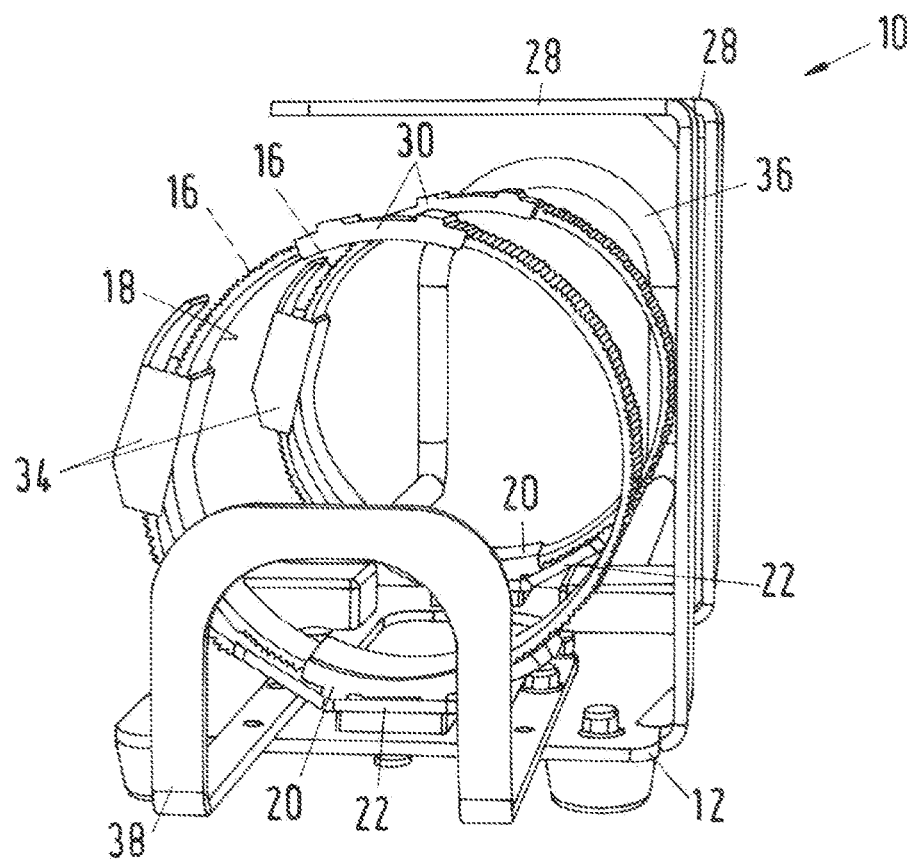

FIG. 3e shows a view of the device 10 from the support element 38. In this case, it can be seen that the band elements 16 are aligned with one another, that is to say that they are configured to encompass the same cylindrical body, which extends through the two band elements 16.

Figure 4:
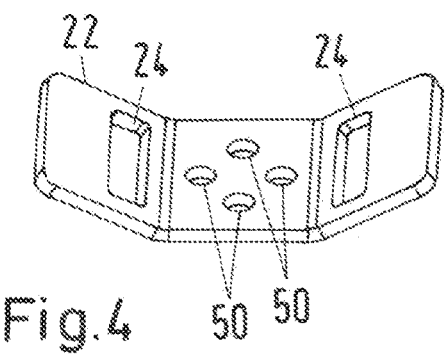
FIG. 4 shows a schematic illustration of a fastening piece.

FIG. 4 shows a fastening piece 22. The fastening piece 22 is in this case configured as an angled plate element in which two tunnels 24 are formed. A band element 16 can be led through the two tunnels 24. The fastening piece 22 can further be connected to the frame element 12 by means of fastening elements. To this end, the fastening piece has openings 50.

Figure 5A:
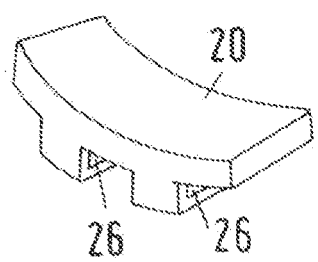
FIG. 5a, b show schematic illustrations of damping elements.
Figure 5B:
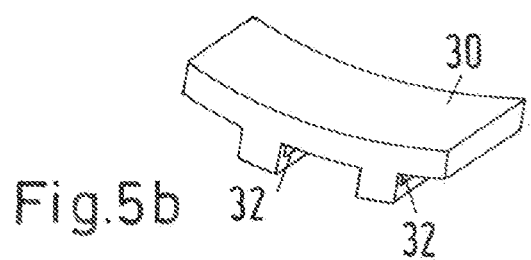

FIGS. 5a and 5b illustrate the damping element 20 and the further damping element 30. FIG. 5a in this case shows the damping element 20. In this case, the damping element 20 has two band tunnels 26 through which a band element 16 can be led. The damping element 20 thus encloses the band element 16, at least at the position of the band tunnels 26.

FIG. 5b shows the further damping element 30, which is configured analogously to the damping element 20 from FIG. 5a. The further damping element 30 in this case comprises two band tunnels 32, which are configured analogously to the band tunnels 26 from FIG. 5a. In this regard, reference is therefore made to FIG. 5a.

The invention is not restricted to one of the above-described embodiments, but can be modified in many ways. In addition to the use in conventional water, land or air vehicles serving for patient transport, such as helicopters, ambulances or boats and ships, the device according to the invention can for example also be used particularly well in conjunction with wheelchairs and the like.

All of the features and advantages, including structural details, spatial arrangements and method steps, arising from the claims, the description and the drawing may be essential to the invention, both individually and in a wide variety of combinations.

LIST OF REFERENCE SIGNS

10 Device
12 Frame element
14 Cylinder space
16 Band element
18 Inner side
20 Damping element
22 Fastening piece
24 Tunnel
26 Band tunnel
28 Rib element
30 Further damping element
32 Band tunnel
34 Closing element
36 Protective element
38 Support element
40 Bore
42 Rectilinear element
44 Bead
46 Foot
48 Fastening element
50 Opening

The invention claimed is:

1. A device for holding a pressure cylinder, the device (10) having a frame element (12), a cylinder space (14) for receiving a pressure cylinder and at least one band element (16) for securing a pressure cylinder in the cylinder space (14), the at least one band element (16) being connected to the frame element (12), wherein at least one damping element (20) is connected to the at least one band element (16), the at least one damping element (20) being arranged between the cylinder space (14) and the frame element (12), wherein the frame element (12) has at least one fastening piece (22) for fastening of the at least one band element (16), the at least one fastening piece (22) comprising at least two mutually spaced-apart tunnels (24) through which the at least one band element (16) is to be led, the at least one band element (16) extending through both of the at least two mutually spaced-apart tunnels (24).

2. The device as claimed in claim 1, wherein at least part of the at least one damping element (20) is arranged between the at least two mutually space-apart tunnels (24) of the at least one fastening piece (22).

3. The device as claimed in claim 1, wherein the at least one damping element (20) is arranged between the at least one band element (16) and the frame element (12).

4. The device as claimed in claim 1, wherein the at least one damping element (20) has a band tunnel (26) through which the at least one band element (16) is to be led, the at least one band element (16) extending through the band tunnel (26).

5. The device as claimed in claim 1, wherein the frame element (12) has at least one rib element (28) which extends at least partially around the cylinder space (14) and the at least one band element (16).

6. The device as claimed in claim 1, wherein the device (10) has a further damping element (30), the further damping element (30) having a further band tunnel (32) through which the at least one band element (16) is to be led, the further damping element (30) being arranged on the at least one band element (16) such that it can be moved along the at least one band element (16), and the at least one band element (16) extending through the further band tunnel (32).

7. The device as claimed in claim 6, wherein the frame element (12) has at least one rib element (28) which extends at least partially around the cylinder space (14) and the at least one band element (16), and further wherein at least part of the further damping element (30) is arranged between the at least one band element (16) and the at least one rib element (28).

8. The device as claimed in claim 1, wherein the at least one damping element (20) is a rubber buffer.

9. The device as claimed in claim 1, wherein the at least one band element (16) is a strap.

* * * * *